(12) United States Patent
Ahn

(10) Patent No.: US 9,724,860 B2
(45) Date of Patent: Aug. 8, 2017

(54) THIN TYPE INJECTION MOLDING SKIN MANUFACTURING APPARATUS AND SKIN TAKING OUT METHOD OF THE SAME

(71) Applicants: Hyundai Motor Company, Seoul (KR); Kia Motors Corporation, Seoul (KR)

(72) Inventor: Gye Young Ahn, Seoul (KR)

(73) Assignee: Hyundai Motor Company, Seoul (KR)

( * ) Notice: Subject to any disclaimer, the term of this patent is extended or adjusted under 35 U.S.C. 154(b) by 69 days.

(21) Appl. No.: 14/956,112

(22) Filed: Dec. 1, 2015

(65) Prior Publication Data

US 2017/0001350 A1    Jan. 5, 2017

(30) Foreign Application Priority Data

Jul. 2, 2015 (KR) ........................ 10-2015-0094482

(51) Int. Cl.
*B29C 45/40* (2006.01)
*B29C 45/26* (2006.01)
*B29C 45/04* (2006.01)
*B29L 31/30* (2006.01)
*B29C 45/33* (2006.01)
*B29C 45/44* (2006.01)

(52) U.S. Cl.
CPC ...... *B29C 45/2628* (2013.01); *B29C 45/0416* (2013.01); *B29C 45/40* (2013.01); *B29C 45/4005* (2013.01); *B29C 45/33* (2013.01); *B29C 45/44* (2013.01); *B29L 2031/3005* (2013.01)

(58) Field of Classification Search
CPC ............ B29C 45/2628; B29C 45/0416; B29C 45/382; B29C 45/4005; B29C 45/40; B29C 45/4225; B29C 2045/2719; B29C 2045/388
See application file for complete search history.

(56) References Cited

U.S. PATENT DOCUMENTS 5,718,849 A * 2/1998 Maus ................. B29C 37/0007
264/2.2
2015/0165664 A1* 6/2015 Kobune ............. B29C 45/4225
264/328.1

FOREIGN PATENT DOCUMENTS

| EP | 3090853 | * 11/2016 |
| JP | 60-124218 | * 7/1985 |
| JP | 2-141207 A | 5/1990 |
| JP | 9-262875 A | 10/1997 |
| JP | 2000-135724 A | 5/2000 |
| JP | 2003-181885 A | 7/2003 |
| JP | 2003-245955 A | 9/2003 |

(Continued)

*Primary Examiner* — Jill Heitbrink
(74) *Attorney, Agent, or Firm* — Morgan Lewis & Bockius LLP

(57) ABSTRACT

A thin type injection molding skin manufacturing apparatus in which a mold movable part moves to be separated from a mold fixing part at a time of taking out a skin to open a mold, may include a holder part cavity for molding a holder part formed integrally with the skin, which is formed inside the mold fixing part and a fixing part slider capable of elastically pressing the holder part molded in the holder part cavity installed on the end of the holder part cavity, and as a result, the fixing part slider presses and holds the holder part molded integrally with the skin when the mold movable part moves to be separated from the mold fixing part.

9 Claims, 6 Drawing Sheets

(56) References Cited

FOREIGN PATENT DOCUMENTS

| JP | 2005-178066 A | 7/2005 |
|---|---|---|
| JP | 3782658 B2 | 3/2006 |

\* cited by examiner

THIN TYPE INJECTION MOLDING SKIN MANUFACTURING APPARATUS AND SKIN TAKING OUT METHOD OF THE SAME

CROSS-REFERENCE TO RELATED APPLICATION

The present application claims priority to Korean Patent Application No10-2015-0094482 filed on Jul. 2, 2015, the entire contents of which is incorporated herein for all purposes by this reference.

BACKGROUND

Field of the Invention

The present disclosure relates to a thin type injection molding skin manufacturing apparatus and a skin taking out method of the same. More particularly, it relates to a thin type injection molding skin manufacturing apparatus and a skin taking out method of the same which are used to minimize surface damage to a skin, which occurs due to attachment of the skin to a mold movable part while opening a mold in order to take out a skin molded at the time of manufacturing a thin type injection molding skin.

Description of Related Art

In general, as an interior material installed in an automobile interior, a crash pad for safety of passengers is installed in front of a passenger's seat and a driver's seat when an accident occurs.

In general, the crash pad of an automobile is manufactured to have an external aesthetic while having a property to absorb a certain degree of shock by using a foam material and has a structure including a skin injection-formed in a thin type as a skin material for the aesthetic of the surface.

FIG. 7 is a schematic view illustrating a manufacturing and taking out apparatus of the thin type injection-molding skin in the related art.

Referring to FIG. 7, the manufacturing and taking out apparatus of the thin type injection molding skin in the related art injection-molds a skin 1 while closing a mold by moving a mold movable part 2 to a mold fixing part 3 when molding a thin type skin (alternatively, an injection object 1) and thereafter, opens the mold and removes the skin 1 attached to the mold movable part 2 by using a pushing pin 4 to take out the skin 1 molded in the mold.

However, the manufacturing and taking out apparatus of the thin type injection molding skin in the related art has a problem in that the skin is attached to the mold movable part to be removed from the mold fixing part while moving the mold movable part to open the mold and in this case, an embossing shape formed on the surface of the skin is rubbed by the mold fixing part, and as a result, scratch damage occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a thin type injection molding skin manufacturing apparatus and a skin taking out method of the same that prevent a phenomenon in which a skin moves together with a mold movable part while opening a mold at the time of manufacturing a thin type injection molding skin and that achieve an uncoating quality by opening the mold and thereafter, removing the skin attached to a mold fixing part while minimizing damage.

In one aspect, the present invention provides a thin type injection molding skin manufacturing apparatus in which a mold movable part moves to be separated from a mold fixing part at the time of taking out a skin to open a mold, in which a holder part cavity for molding a holder part formed integrally with the skin is formed inside the mold fixing part and a fixing part slider capable of elastically pressing the molded holder part in the holder part cavityis is installed on the end of the holder part cavity, and as a result, the fixing part slider presses and holds the holder part molded integrally with the skin when the mold movable part moves to be separated from the mold fixing part.

In a exemplary embodiment, the fixing part slider may be mounted on the end of the holder part cavity via a holder part pressing spring to be elastically supported, the fixing part slider may move by force to pull the the fixing part slider in a direction to compress the holder part pressing spring to form a space in which an injection resin is charged therebelow during molding the holder part, and when force to pull a fixing part slider in the direction to compress the holder part pressing spring is removed when molding the holder part is completed, the fixing part slider may return in a direction to press the holder part by elastic restoration force of the holder part pressing spring.

In another exemplary embodiment, a grip part cavity for molding the grip part formed integrally with the skin may be formed inside the mold movable part and a movable part slider capable of forming a finger hole at the center of the grip part molded in the grip part cavity may be installed at one side of the grip part cavity, and as a result, the mold movable part may move to be separated from the mold fixing part and thereafter, the skin may be separated and taken out from the mold fixing part by gripping the grip part through the finger hole.

In still another exemplary embodiment, the movable part slider may be elastically supported to be seated on the center of the grip part cavity via the grip part return spring, an injection resin may be charged in the grip part cavity on which the movable part slider is seated to mold the grip part having the finger hole, and when force to pull a movable part slider is applied in a direction to compress the grip part return spring when molding the grip part is completed, the movable part slider may be removed from the grip part cavity to take out the grip part molded in the grip part cavity.

In yet another exemplary embodiment, the mold movable part may have a protrusion inserted into the holder part cavity of the mold fixing part at the time of closing the mold by moving the mold movable part to the mold fixing part and the protrusion may have a smaller diameter than the holder part cavity to form a residual space, in which an injection resin is able to be charged between the protrusion and the holder part cavity at the time of inserting the protrusion into the holder part cavity.

In still yet another exemplary embodiment, the fixing part slider may be installed to linearly move into a slider mounted part that extends on the end of the holder part cavity and an O-ring for preventing the resin from being leaked may be mounted on an outer surface of the fixing part slider adjacent to the slider mounted part to be elastically supported.

In a further exemplary embodiment, the movable part slider may be installed to linearly move into the slider mounted part that extends to the center of the grip part cavity and an O-ring for preventing the resin from being leaked may be mounted on an outer surface of the movable part slider adjacent to the slider mounted part to be elastically supported.

In another aspect, the present invention provides a skin taking out method using a thin type injection molding skin manufacturing apparatus that molds a skin by charging an injection resin in a skin cavity between a mold movable part and a mold fixing part and opens a mold by moving the mold movable part to be separated from the mold fixing part at the time of taking out a skin, including: forming a holder part formed integrally with the skin in a holder part cavity of the mold fixing part linked with the skin cavity; forming a grip part having a finger hole which is integrally formed with the skin in the grip part cavity of the mold movable part linked with the skin cavity and used to separate the skin from the mold fixing part; pressing the holder part by a fixing part slider mounted on the end of the holder part cavity to be elastically supported and holding the holder part into the holder part cavity; and removing a movable part slider for forming the finger hole of the grip part from the grip part cavity in order to take out the grip part from the grip part cavity and further including: opening the mold by moving the mold movable part to be separated from the mold fixing part; hanging and fastening a finger of taking out means to the finger hole of the grip part molded integrally with the skin attached to the mold fixing part; and removing the skin from the mold fixing part by pulling the grip part fastened to the finger of the taking out means.

According to the present invention, a phenomenon is prevented, in which a skin moves together with a mold movable part while opening a mold at the time of manufacturing a thin type injection molding skin, and an uncoating quality is achieved by opening the mold and thereafter removing the skin attached to a mold fixing part while minimizing damage to the surface of the skin.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
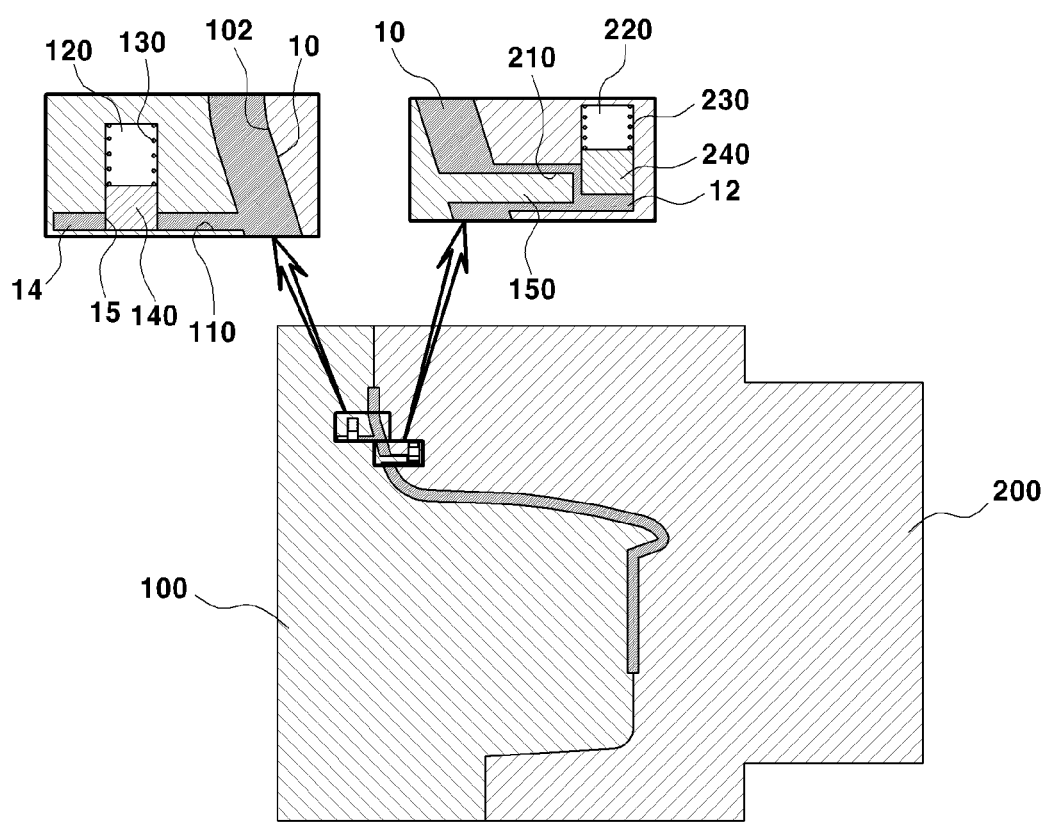
FIG. 1 is a diagram illustrating a mold closing state for skin molding of a thin type injection molding skin manufacturing apparatus according to an embodiment of the present invention.
Figure 2:
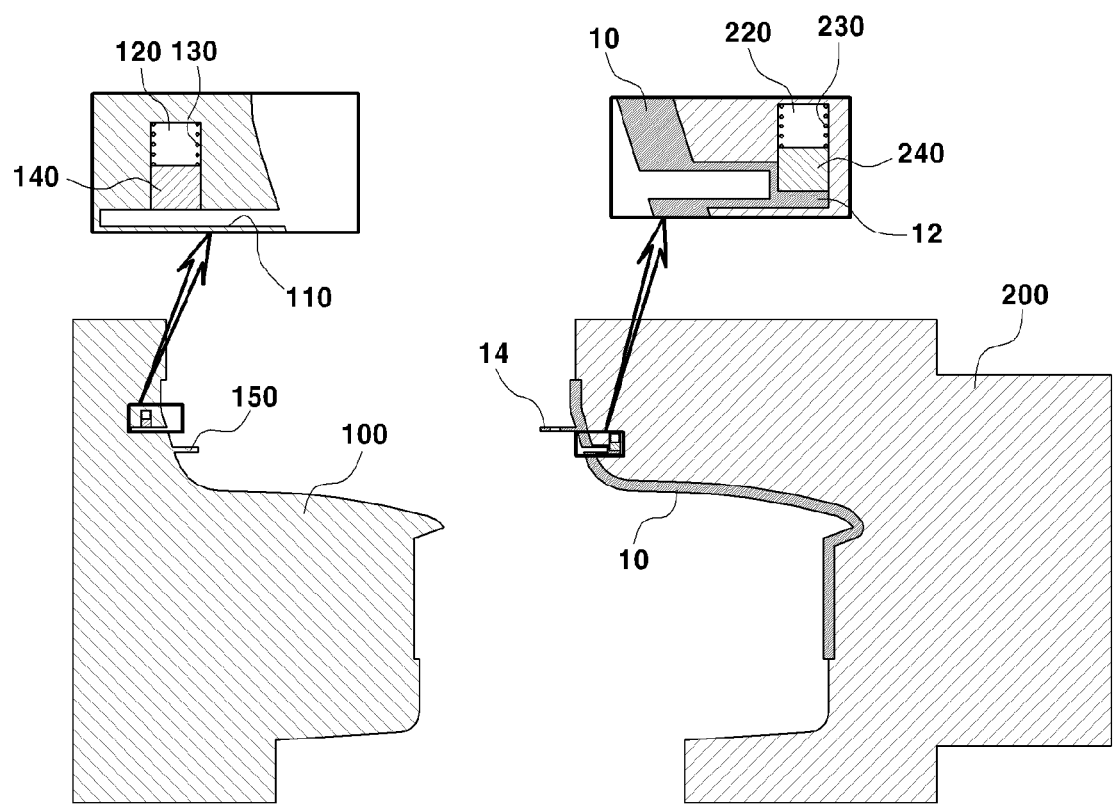
FIG. 2 is a diagram illustrating a mold opening state for taking out a skin in the thin type injection molding skin manufacturing apparatus according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, a exemplary embodiment of the present invention will be described in detail with reference to the accompanying drawings.

As illustrated in FIGS. 1 to 4, a thin type injection molding skin manufacturing apparatus according to an exemplary embodiment of the present invention, as a mold apparatus for manufacturing a skin which is closed as a mold movable part 100 moves to a mold fixing part 200 at the time of molding the skin and opened as the mold movable part 100 is separated from the mold fixing part 200 at the time of taking out the skin 10, includes a holder part cavity 210 for molding a holder part 12 of the skin 10 in the mold fixing part 200 and a grip part cavity 110 for molding a grip part 14 of the skin 10 in the mold movable part 100.

The mold fixing part 200 includes a plurality of holder part cavities 210 at one side thereof based on a cross section and a slider mounted part 220 extends on the end of each holder part cavity 210.

Figure 3:
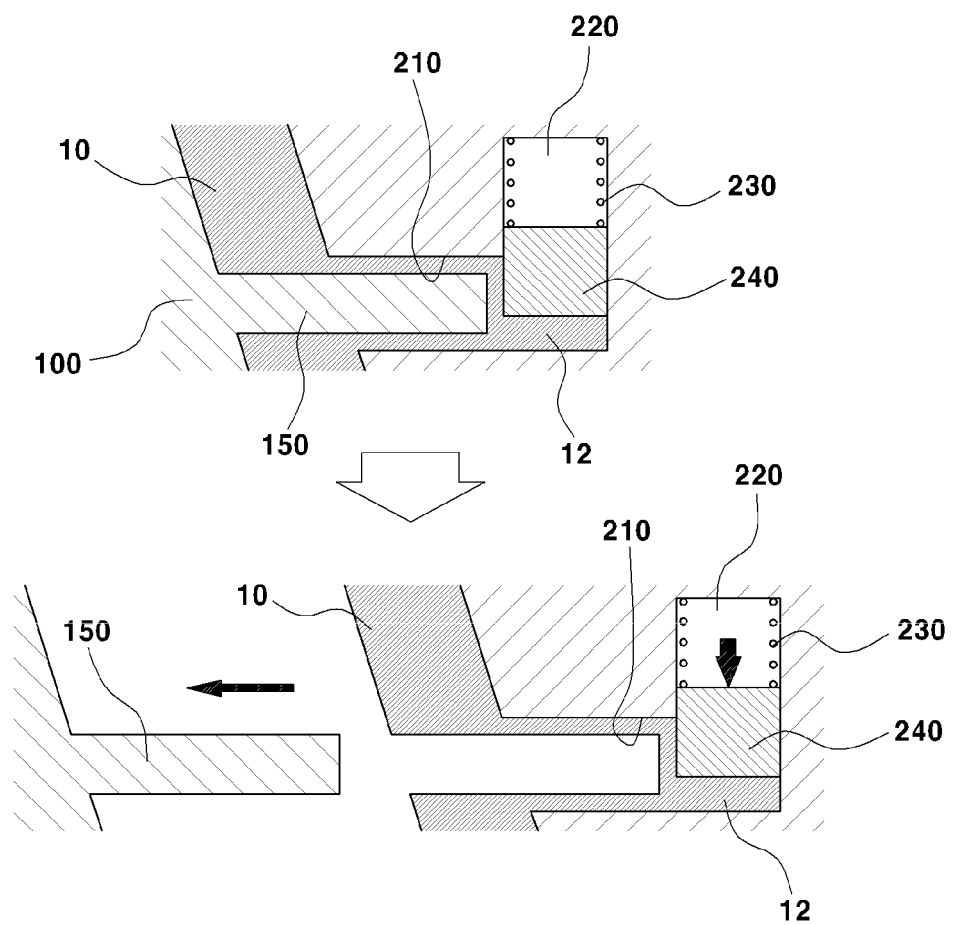
FIG. 3 is a diagram illustrating a skin holding structure of the thin type injection molding skin manufacturing apparatus according to an embodiment of the present invention.

Referring to FIG. 3, a fixing part slider 240 is mounted on the slider mounted part 220 formed inside (on the end of the holder part cavity of) the mold fixing part 200 via a holder part pressing spring 230 which is compressible and restorable to move in a vertical direction (both directions).

Although not illustrated, in the thin type injection molding skin manufacturing apparatus according to the exemplary embodiment of the present invention, a device that pulls the fixing part slider 240 is provided and the fixing part slider 240 moves up in a direction to compress the holder part pressing spring 230 by the means, and as a result, an injection resin injected into the holder part cavity 210 may be charged up to a lower space of the fixing part slider 240.

When molding and curing the holder part 12 are completed and thereafter, force to pull the fixing part slider 240 in the direction to compress the holder part pressing spring 230 is removed, the fixing part slider 240 holds (alternatively, grips) the holder part 12 while elastically pressing the holder part 12 by elastic restoration force of the holder part pressing spring 230.

A plurality of protrusions 150 inserted into each holder part cavity 210 is formed at one side of the mold movable part 100 facing the holder part cavity 210 at the time of closing the mold and each protrusion 150 has a smaller diameter than the holder part cavity 210, and as a result, a residual space in which the injection resin may be charged is formed between the holder part cavity 210 and the protrusion 150 at the time of inserting each protrusion 150 into the holder part cavity 210.

Therefore, the injection resin is smoothly charged inside the holder part cavity 210 and in the lower space of the fixing part slider 240 and a contact area between the holder part 12 and the mold fixing part 200 may be increased.

The mold movable part 100 includes one or more grip part cavities 110 at one side thereof and the slider mounted part 120 that extends vertically toward the top is formed at the center of the grip part cavity 110.

Figure 4:
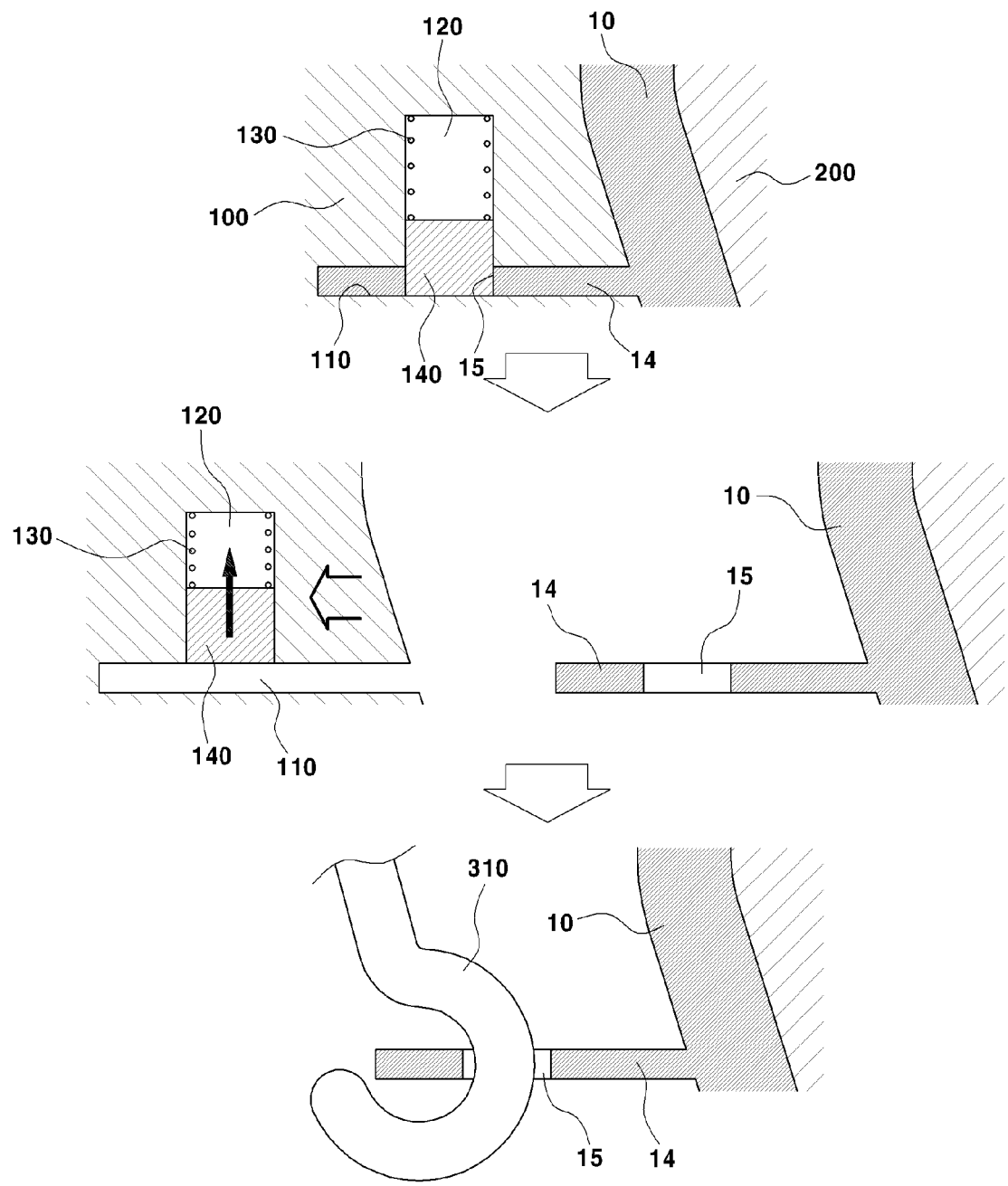
FIG. 4 is a diagram illustrating a skin gripping structure of the thin type injection molding skin manufacturing apparatus according to an embodiment of the present invention.

Referring to FIG. 4, a movable part slider 140 is mounted on the slider mounted part 120 formed inside the mold movable part 100 via a grip part return spring 130 which is compressible and restorable to move in the vertical direction (both directions).

Although not illustrated, in the thin type injection molding skin manufacturing apparatus according to the exemplary embodiment of the present invention, a device that pulls (alternatively, draws) the movable part slider 140 is provided and the movable part slider 140 may move up in a direction to compress the grip part return spring 130 by the means.

When the force to draw the movable part slider 140 in the direction to compress the grip part return spring 130 is removed before the injection resin is charged in the grip part cavity 110 (that is, before the grip part is molded), the movable part slider 140 elastically returns to the grip part cavity 110 by the elastic restoration force of the grip part return spring 130 and the injection resin is charged in the grip part cavity 110 while the movable part slider 140 returns to the grip part cavity 110 to mold the grip part 14, and as a result, a finger hole 15 is molded at the center of the grip part 14.

After molding the grip part 14 is completed, the movable part slider 140 is removed from the finger hole 15 of the grip part 14 by drawing the movable part slider 140 in the direction to compress the grip part return spring 130 before opening the mold by moving the mold movable part 100 and thereafter, the mold is opened and a finger 310 of a take-out robot 300 is fastened to the finger hole 15 while being hung and gripped (alternatively, caught) to the finger hole 15.

The take-out robot 300 has a hanger type finger 310 which may be fastened while being hung to the finger hole 15 of the grip part 14 and the take-out robot 300 serves as a taking out device that removes and separates the skin 10 from the mold fixing part 200 by pulling the skin 10 while gripping the grip part 14 through the finger 310.

The injection resin that is injected into a skin cavity 102, the holder part cavity 210, and the grip part cavity 110, as a high-flow material which is higher in flow speed than a general injection resin, has the same viscosity as water at a high injection temperature.

In the case where a slider made of the same material as a general injection mold is applied, when the resin is hardened while the resin leaks to a gap between the slider and the mold (the mold fixing part or the mold movable part), the slider is fixed to the mold, which causes a faulty mold operation.

Figure 5:
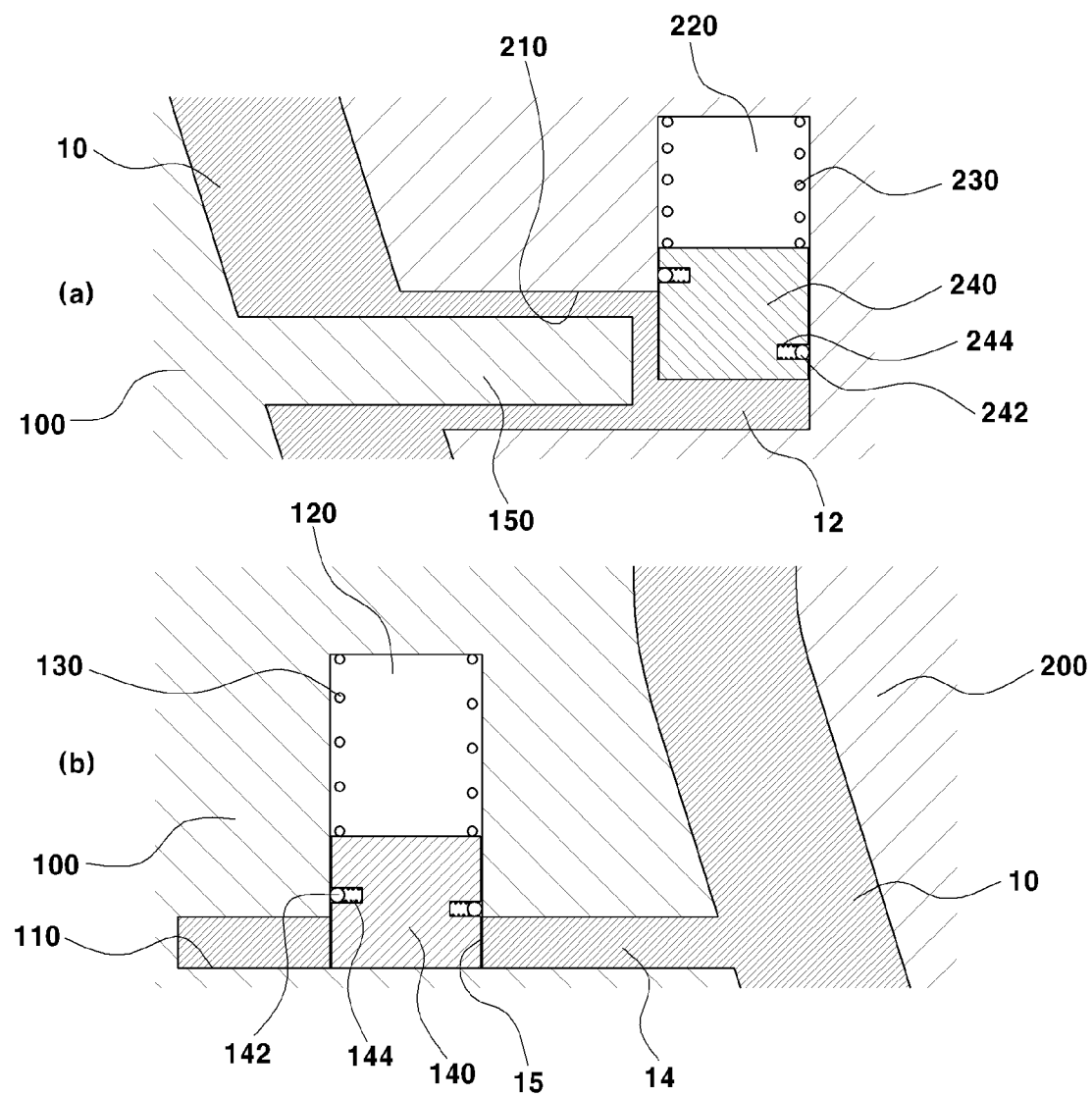
FIG. 5 is an enlarged diagram illustrating an O-ring mounting structure (a) of a fixing part slider and an O-ring mounting structure (b) of a movable part slider according to an embodiment of the present invention.
Figure 6:
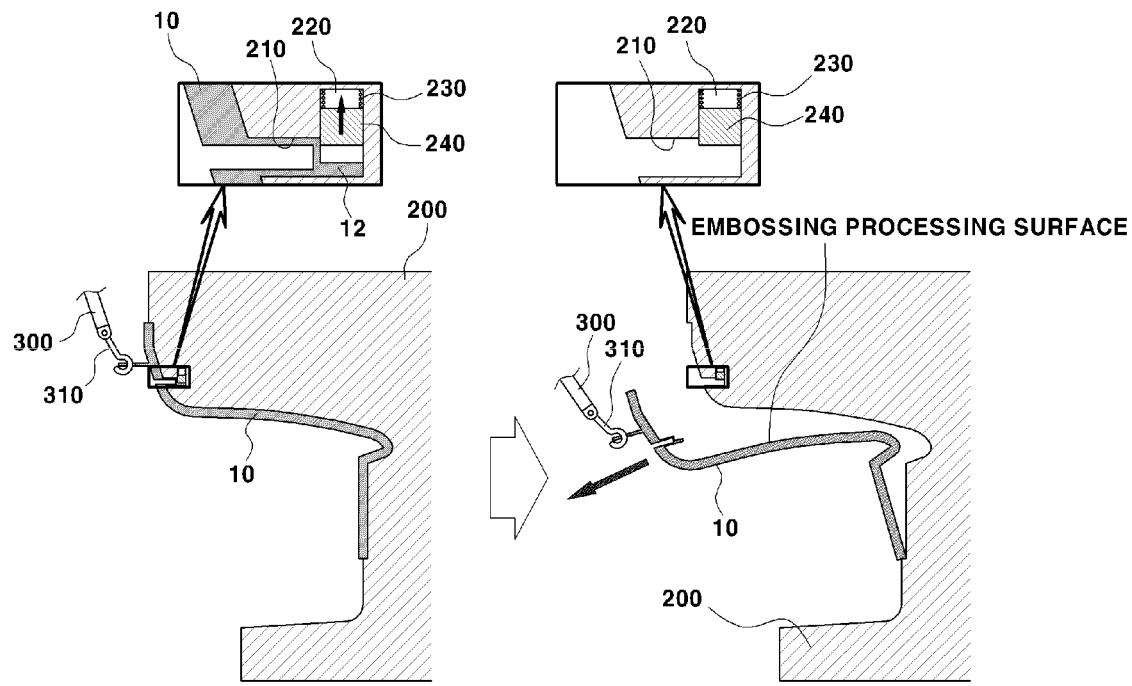
FIG. 6 is a diagram illustrating a skin taking out method using a thin type injection molding skin manufacturing apparatus according to an embodiment of the present invention.
Figure 7:
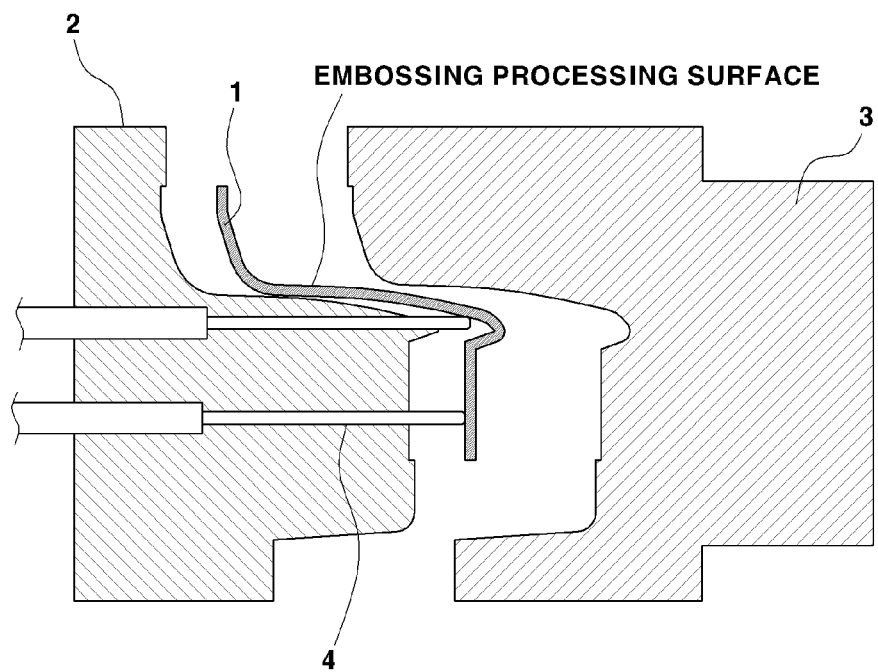
FIG. 7 is a diagram illustrating a manufacturing and taking out apparatus of a thin type injection molding skin in the related art.

Therefore, as illustrated in FIG. 5, O-rings 242 and 142 are mounted on the fixing part slider 240 and the movable part slider 140 in order to prevent the resin from leaking to the slider mounted parts 220 and 120.

The O-ring 242 that is elastically supported by a spring member 244 is mounted on an inner wall surface of the mold fixing part 200, that is, an outer surface adjacent to the slider mounted part 220 in the fixing part slider 240 and the O-ring 142 which is elastically supported by the spring member 144 is mounted on an inner wall surface of the mold movable part 100, that is, an outer surface adjacent to the slider mounted part 120 in the movable part slider 140.

In the skin 10 manufactured by the thin type injection molding skin manufacturing apparatus of the present invention based on the configuration, a plurality of holder parts 12 are molded on a periphery at one side (a surface side having an embossing processing surface), at least one grip part 14 is molded on a periphery at the other side (inner surface side), and preferably, at least two grip parts 14 disposed at both left and right sides on the periphery at the other side are molded.

Herein, a skin taking out method using the thin type injection molding skin manufacturing apparatus of the present invention based on the configuration will be described below.

As illustrated in FIG, 1, when the injection resin is injected into the skin cavity 102 between the mold fixing part 200 and the mold movable part 100 to mold the skin 10 while the mold movable part 100 moves toward the mold fixing part 200 to close the mold, the injection resin is charged even in the holder part cavity 210 of the mold fixing part 200 and the grip part cavity 110 of the mold movable part 100, and as a result, the holder part 12 and the grip part 14 are molded integrally with the skin 10.

The mold is opened by separating the mold movable part 100 from the mold fixing part 200 in order to take out the skin 10 from the mold, the holder part 12 of the skin 10 is pressed and held by the holder part pressing spring 230 by removing force to pull the fixing part slider 240 upward (in the direction to compress the holder part pressing spring 230) first before opening the mold, and the movable part slider 140 is pulled upward (in the direction to compress the grip part return spring 130) to be separated and removed from the finger hole 15 of the grip part 14.

Next, the mold is opened by moving the mold movable part 100 to be separated from the mold fixing part 200 to take out the skin and the elastic restoration force of the holder part pressing spring 230 that presses the holder part 12 is removed by pulling the fixing part slider 240 upward again.

Next, the hanger type finger 310 of the take-out robot 300 is hung and fastened to the finger hole 15 of the grip part 14 by inputting the take-out robot 300 and thereafter, the skin 10 is automatically separated from the mold fixing part 200 through the take-out robot 300 and in this case, the take-out robot 300 pulls the skin 10 in a diagonal direction from the top on which the grip part 14 is formed to remove (separate) the skin 10 while minimizing surface damage.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A thin type injection molding skin manufacturing apparatus in which a mold movable part moves to be separated from a mold fixing part at a time of taking out a skin to open a mold,
   wherein a holder part cavity for molding a holder part formed integrally with the skin is formed inside the mold fixing part and a fixing part slider elastically pressing the holder part molded in the holder part cavity installed on an end of the holder part cavity, and as a result, the fixing part slider presses and holds the holder part molded integrally with the skin when the mold movable part moves to be separated from the mold fixing part.

2. The apparatus of claim 1, wherein the fixing part slider is mounted on the end of the holder part cavity via a holder part pressing spring to be elastically supported, the fixing part slider moves by force to pull the fixing part slider in a direction to compress the holder part pressing spring to form a space in which an injection resin is charged therebelow during molding the holder part, and when force to pull the fixing part slider is removed in the direction to compress the holder part pressing spring when molding the holder part is completed, the fixing part slider returns in a direction to press the holder part by elastic restoration force of the holder part pressing spring.

3. The apparatus of claim 1, wherein a grip part cavity for molding the grip part formed integrally with the skin is formed inside the mold movable part and a movable part slider forming a finger hole at the center of the grip part molded in the grip part cavity is installed at a side of the grip part cavity, and as a result, the mold movable part moves to be separated from the mold fixing part and thereafter, the skin is separated and taken out from the mold fixing part by gripping the grip part through the finger hole.

4. The apparatus of claim 3, wherein the movable part slider is elastically supported to be seated on the center of the grip part cavity via a grip part return spring, an injection resin is charged in the grip part cavity on which the movable part slider is seated to mold the grip part having the finger hole, and when force to pull a movable part slider is applied in a direction to compress the grip part return spring when molding the grip part is completed, the movable part slider is removed form the grip part cavity to take out the grip part molded in the grip part cavity.

5. The apparatus of claim 1, wherein the mold movable part has a protrusion inserted into the holder part cavity of the mold fixing part at a time of closing the mold by moving the mold movable part to the mold fixing part and the protrusion has a smaller diameter than the holder part cavity to form a residual space, in which an injection resin is configured to be charged between the protrusion and the holder part cavity at a time of inserting the protrusion into the holder part cavity.

6. The apparatus of claim 1, wherein the fixing part slider is installed to linearly move into a slider mounted part that extends on the end of the holder part cavity and an O-ring for preventing the resin from being leaked is mounted on an outer surface of the fixing part slider adjacent to the slider mounted part to be elastically supported.

7. The apparatus of claim 1, wherein the movable part slider is installed to linearly move into the slider mounted part that extends to the center of the grip part cavity and an O-ring for preventing the resin from being leaked is mounted on an outer surface of the movable part slider adjacent to the slider mounted part to be elastically supported.

8. A skin taking out method using a thin type injection molding skin manufacturing apparatus that molds a skin by charging an injection resin in a skin cavity between a mold movable part and a mold fixing part and opens a mold by moving the mold movable part to be separated from the mold fixing part at a time of taking out a skin, the method including:
   forming a holder part formed integrally with the skin in a holder part cavity of the mold fixing part linked with the skin cavity,
   forming a grip part having a finger hole which is integrally formed with the skin in the grip part cavity of the mold movable part linked with the skin cavity and used to separate the skin from the mold fixing part,
   pressing the holder part by a fixing part slider mounted on an end of the holder part cavity to be elastically supported and holding the holder part into the holder part cavity, and
   removing a movable part slider for forming the finger hole of the grip part from the grip part cavity to take out the grip part from the grip part cavity.

9. The method of claim 8, further including:
   opening the mold by moving the mold movable part to be separated from the mold fixing part,
   hanging and fastening a finger of taking out device to the finger hole of the grip part molded integrally with the skin attached to the mold fixing part, and
   removing the skin from the mold fixing part by pulling the grip art fastened to the finger of the taking out device.

* * * * *

UNITED STATES PATENT AND TRADEMARK OFFICE
CERTIFICATE OF CORRECTION

PATENT NO. : 9,724,860 B2  
APPLICATION NO. : 14/956112  
DATED : August 8, 2017  
INVENTOR(S) : Gye Young Ahn Page 1 of 1

It is certified that error appears in the above-identified patent and that said Letters Patent is hereby corrected as shown below:

On the Title Page

In item (73) Assignee, under Hyundai Motor Company, Seoul (KR), please insert therefor:
-- Kia Motors Corporation, Seoul (KR) --.

Signed and Sealed this  
Sixteenth Day of January, 2018

Joseph Matal  
*Performing the Functions and Duties of the*  
*Under Secretary of Commerce for Intellectual Property and*  
*Director of the United States Patent and Trademark Office*